United States Patent [19]

Adams

[11] Patent Number: 5,482,081
[45] Date of Patent: Jan. 9, 1996

[54] SINGLE HANDLE MANIFOLD

[75] Inventor: Don L. Adams, Tulia, Tex.

[73] Assignee: D/A Manufacturing Co. Inc., Tulia, Tex.

[21] Appl. No.: 421,752

[22] Filed: Apr. 14, 1995

[51] Int. Cl.⁶ .................................... F16K 11/087
[52] U.S. Cl. ................ 137/597; 137/625; 251/220; 251/297
[58] Field of Search .................. 137/595, 597, 137/625; 251/220, 297

[56] References Cited

U.S. PATENT DOCUMENTS

| | | | |
|---|---|---|---|
| 3,078,067 | 2/1963 | Engle | 251/220 X |
| 3,450,157 | 6/1969 | Hewson | 137/595 |
| 3,894,559 | 7/1975 | DePuy | 137/595 |
| 4,602,657 | 7/1986 | Anderson, Jr. et al. | 137/595 |
| 4,668,889 | 5/1987 | Adams | 310/338 |
| 4,738,276 | 4/1988 | Adams | 137/343 |
| 4,865,360 | 9/1989 | Adams | 285/158 |
| 4,977,917 | 12/1990 | Adams | 137/597 |
| 5,117,867 | 6/1992 | Adams | 137/597 |
| 5,209,258 | 5/1993 | Sharp et al. | 137/597 X |

*Primary Examiner*—Stephen M. Hepperle
*Attorney, Agent, or Firm*—Daniel V. Thompson

[57] ABSTRACT

A single-handled manifold for connecting a differential pressure transmitter to a source of differential pressure is provided. The manifold includes a body wherein a rotor is mounted for combined axial and rotary motion. Automatic sequencing of the various functions is provided by way of a single handle with multiple selectable positions.

11 Claims, 3 Drawing Sheets

SINGLE HANDLE MANIFOLD

REFERENCE TO DISCLOSURE DOCUMENT

A reference is hereby made to Disclosure Document No. 353663 filed May 6, 1994.

FIELD OF THE INVENTION

This invention relates to valve manifolds for differential pressure transmitters.

BACKGROUND OF THE INVENTION

Differential pressure transmitters have long been known in the art. Typical differential transmitter systems are illustrated in, for example, my prior U.S. Pat. No. 5,117,867, the disclosure of which is incorporated herein by reference.

As explained in my prior patent, a differential pressure transmitter system is used with a pipeline in which there is a flowing media which needs to be measured as to flow rate. An accurate and economical method of measuring flow rate is to install an orifice in the pipeline. The orifice causes a differential pressure as media is forced through the small opening of the orifice, which is differentially sensed by a transmitter through process pressure signal lines. The amount of differential pressure developed is a square root function of the flow rate. Consequently, by knowing the size of the precision opening in the orifice plate, and by obtaining a precision measurement of the differential pressure, the flow rate may be calculated with greater than one percent accuracy.

It is conventional to provide a valve manifold to interface with the two process pressure signal lines from the orifice. However, all manifolds providing complete functionality have required at least three and, in some cases, five separate valve handles. The multiplicity of handles, and the precise sequence required to obtain the desired functions, has led to an overly complicated system that requires careful training and consistent execution to obtain accurate results and avoid damaging the equipment. The differential pressure transmitter is a relatively delicate instrument, and a high degree of care and consistent operation by workers in the field is required to avoid damage.

SUMMARY OF THE INVENTION

The present invention provides a novel manifold for a differential pressure transmitter in a fluid conveying pipeline. In one aspect of the invention, a valving arrangement is provided that allows for automatic sequencing of a single-handled valve for all service functions.

BRIEF DESCRIPTION OF THE DRAWINGS

A more complete understanding of the invention and its advantages will be apparent from the following Detailed Description taken in conjunction with the accompanying Drawings in which.

DETAILED DESCRIPTION OF THE PREFERRED EMBODIMENT

I have invented an improved differential pressure manifold that completely eliminates the unwieldy, expensive and difficult to learn multi-handle transmitter hardware package typified in the prior art. While the system of my prior U.S. Pat. No. 5,117,867 made a substantial step in the direction of simplifying differential pressure manifolds, the system of that patent still contained multiple handles and required a specific sequence of handle movements to obtain all the functions of the device. In fact, a goal of the prior system was to have a manifold structure that maintained the physical look and functionalism of the prior art multiple valve hardware systems. The present invention, in contrast, takes a radical departure from the prior art, combining all of the functions into a single-valve handle manifold in which the proper sequence of connections and disconnections between the various internal passageways is enabled.

Figure 1:
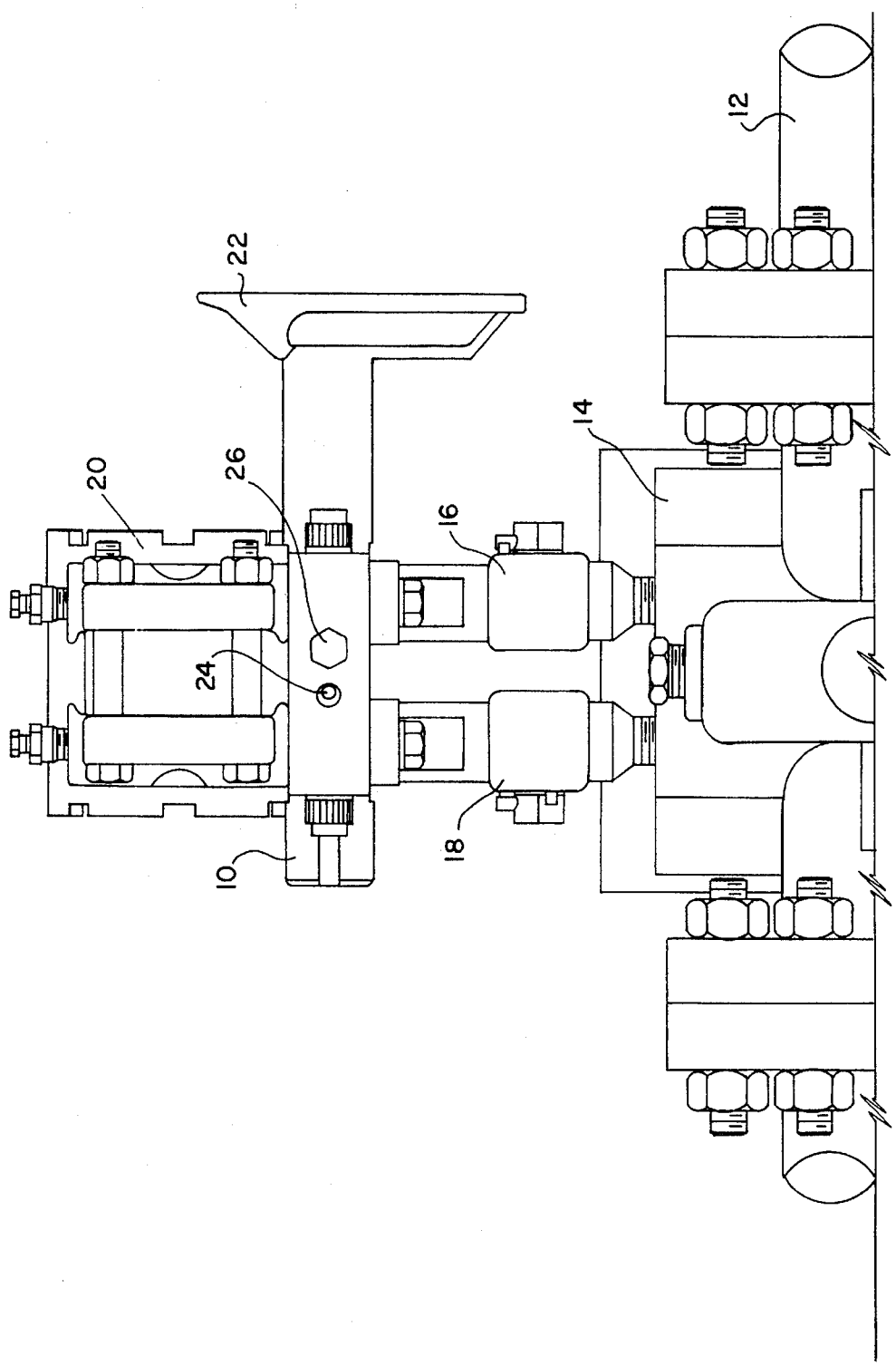
FIG. 1 is a side view of the manifold of the present invention installed in its typical environment.

As shown in FIG. 1, manifold 10 is connected to a pipeline 12 adjacent an orifice location 14. The orifice within location 14, which is not shown, creates a differential pressure between first and second input connectors 16 and 18. Input connectors 16 and 18 are mounted to manifold 10. A differential pressure transmitter 20 is connected on the side of manifold 10 opposite input connectors 16 and 18. Manifold 10 includes a single handle 22, as will be described in more detail below. Manifold 10 also includes a vent/static calibrate port 24 and a differential pressure calibration port 26.

Figure 2:
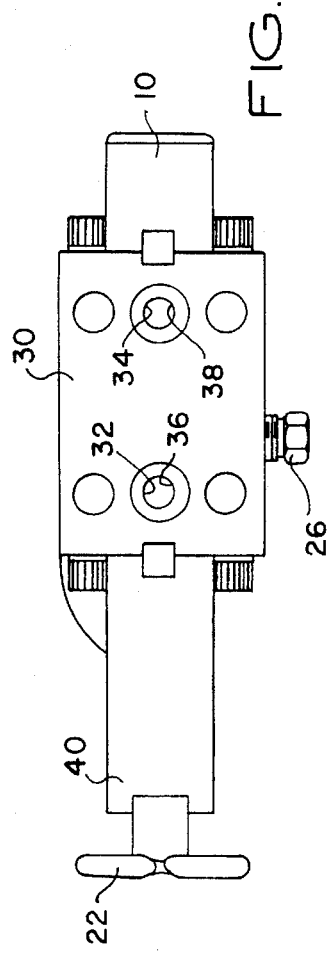
FIG. 2 is an overhead view of the manifold of FIG. 1, removed from the pipeline and differential pressure transmitter.

Referring now to FIG. 2, manifold 10 includes a body 30 having first and second input passageways 32, 34 adapted to be connected to the pipeline 12 by way of connectors 16, 18. First and second instrument passageways 36, 38 are adapted to be connected to transmitter 20 for measuring differential pressure. A placard 40 is fixed to the handle 22 for indicating various positions and functions of the device.

Figure 3:
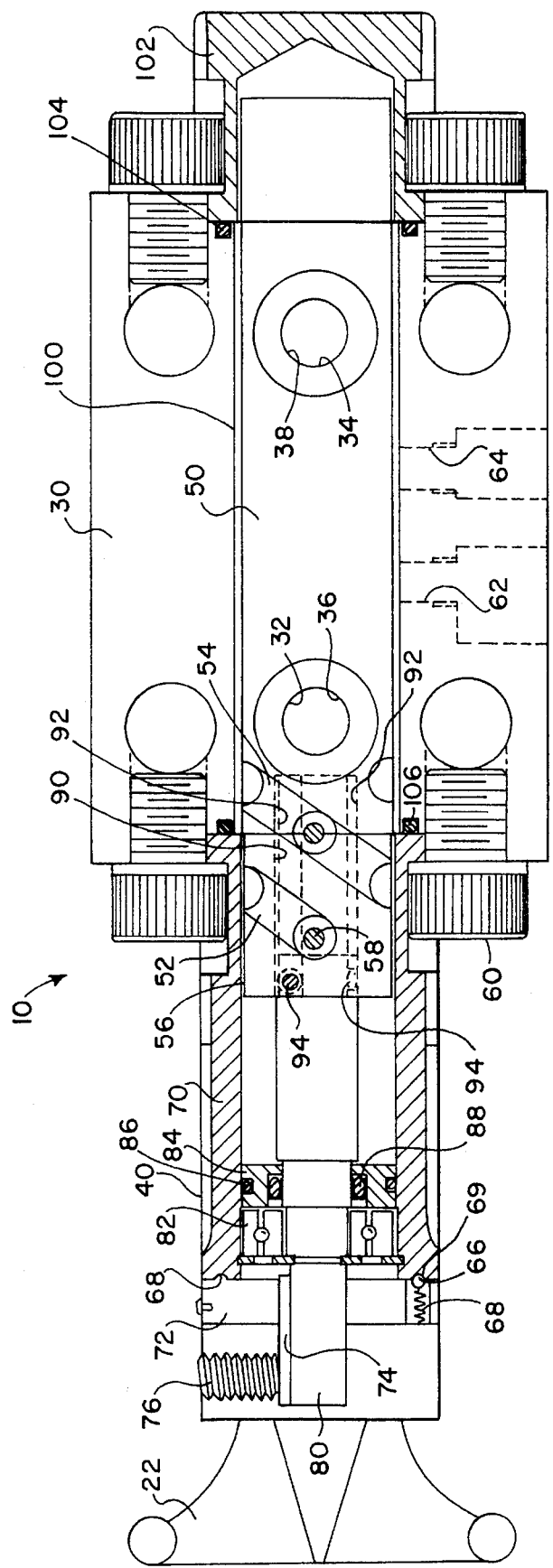
FIG. 3 is a partially broken away overhead view.

Referring now to FIG. 3, a rotor 50 is mounted within body 30 for a combination of axial and rotary motion with respect to body 30. The motion of rotor 50 with respect to body 30 is between a first limit and a second limit. Rotor 50 has walls defining spiral grooves 52 and 54 in outer surface 56. The body has trapped balls 58 and 60 sliding in the grooves 52, 54 to define the axial and rotary motion of the rotor 50 with respect to the body 30. The first and second limits are about 270 degrees apart. Rotor 50 also has a plurality of passageways running from different locations in its outer surface 56 that are not shown in FIG. 3, but which, when positioned with respect to the various passageways in body 30, enable the desired functions of the manifold 10. Body 30 includes a differential pressure calibration passageway 62 and a vent/static calibrate passageway 64. The multiple positions of the rotor 50 with respect to body 30 are defined by detent ball 66 forced by pressure of spring 68 into multiple detent cavities 69. Preferably, the detent cavities are 90 degrees apart in neck 70. Neck 70 is fixed with respect to body 30. In contrast, handle 22 rotates with respect to neck 70 and body 30 between the various selectable positions. Placard 40 and the detent ball and spring 66, 68 are carried by solid placard carrier 72. Placard carrier 72 and handle 22 are connected by way of a woodruff key 74 and set screw 76 to a shaft 80 for co-rotation therewith. Shaft 80 is rotatably mounted within neck 70 by way of a ball bearing 82. A seal carrier 84 seals shaft 80 and neck 70 by way of O-ring 86 and spring-loaded Teflon seal 88.

Rotor 50 has an internal surface 90 in which a plurality of longitudinal grooves 92 are provided. A plurality of balls 94 embedded in shaft 80 enable rotor 50 to be co-rotated with shaft 80 but axially displaced with respect to shaft 80. The combination of longitudinal grooves 92 and spiral grooves 54 define the axial and rotary motion of the rotor with respect to the body. In other words, handle 22 is interconnected with rotor 50 and body 30, with the handle 22 being rotatably movable with respect to body 30 and the rotor being axially movable with respect to the handle. In combination, the rotor 50 is axially and rotatably movable with respect to body 30. The combination of axial and rotary motion enables the selectable positioning of passageways in the rotor 50 and passageways in the body 30.

Rotor 50 is interfitted with body 30 by way of a plastic rotor bearing 100. Rotor bearing 100 is preferably made of a low friction, chemically-inert material. An end cap 102 is provided at the end of body 30 opposite handle 22, and is sealed by O-ring 104. A similar O-ring 106 is provided at the other end of body 30 to seal neck 70.

Figure 4A:
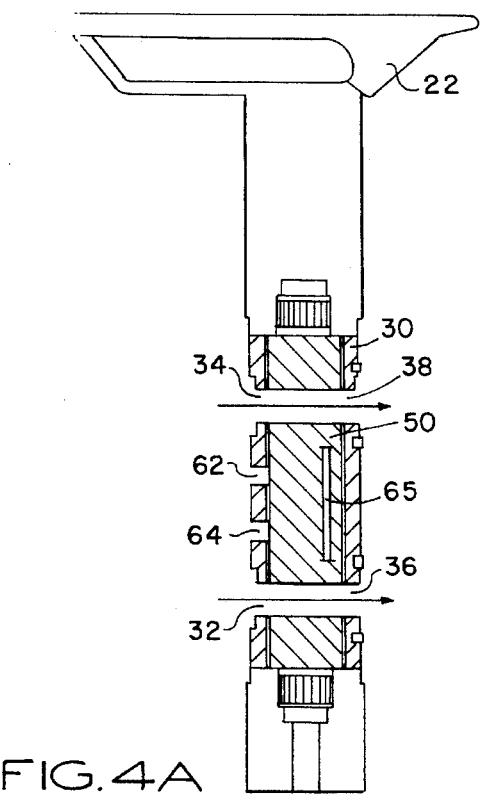
FIGS. 4A, 4B, 4C and 4D are schematic representations of the operation of the manifold in its several selectable positions.

As best shown in FIG. 4A, rotor 50 has a first selectable "NORMAL" position at the first limit. In the normal position, the first input passageway 32 is connected through rotor 50 to the first instrument passageway 36. The second input passageway 34 is connected through rotor 50 to the second instrument passageway 38. Differential pressure calibration passageway 62 and vent/static calibrate passageway 64 are blocked by rotor 50.

Figure 4B:
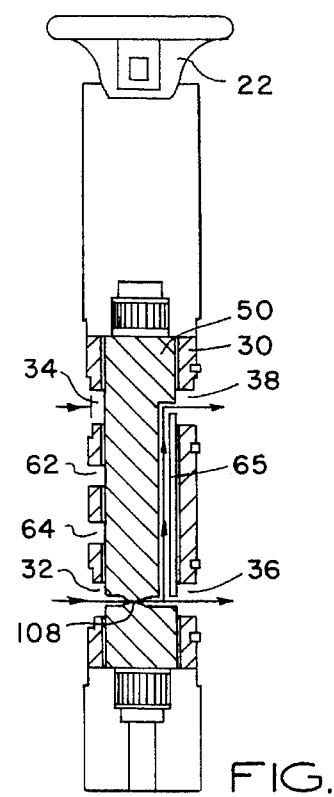

In FIG. 4B, rotor 50 is in its second selectable "ZERO/REPRESSURIZE" position moved from the first selectable "NORMAL" position of FIG. 4A in the direction of the second limit. The dual-mode designation "ZERO/REPRESSURIZE" indicates that when moved from the first "NORMAL" position, the device is in "ZERO" mode, while when moved from the third selectable position described below, the device is in "REPRESSURIZE" mode. The first input passageway 32 is connected through rotor 50 to both the first and second instrument passageways 36, 38 via equalizer passageway 65. In contrast, in FIG. 4A, equalizer passageway 65 is double-blocked. The second input passageway 34 is blocked by the rotor. Again, as in the "NORMAL" position, the differential pressure calibration passageway 62 and vent/static calibrate passageway 64 are blocked by the rotor.

Figure 4C:
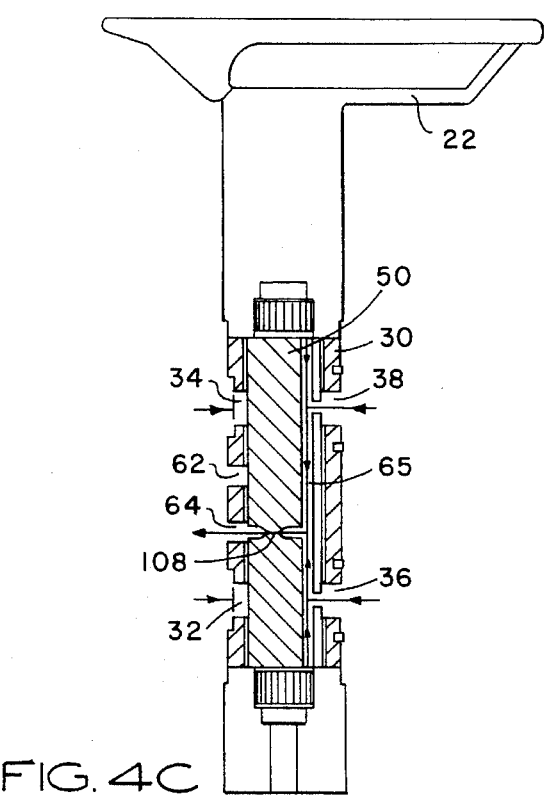

In FIG. 4C, the rotor 50 is in a third selectable "DEPRESSURIZE/GAGE P CALIBRATE" position moved from the second selectable "ZERO/REPRESSURIZE" position in the direction of the second limit. The first and second input passageways 32, 34 are blocked by rotor 50. First and second instrument passageways 36, 38 are connected through the rotor 50 to the vent/static calibrate passageway 64. A throttling orifice 108 between the first input passageway 32 and the first and second instrument passageways 36, 38 permits slow repressurization of the transmitter in the second selectable position after depressurization in the third selectable position. As in FIGS. 4A and 4B, differential pressure calibration passageway 62 is blocked by rotor 50 when the rotor is in the third selectable "DEPRESSURIZE/GAGE P CALIBRATE" position.

Figure 4D:
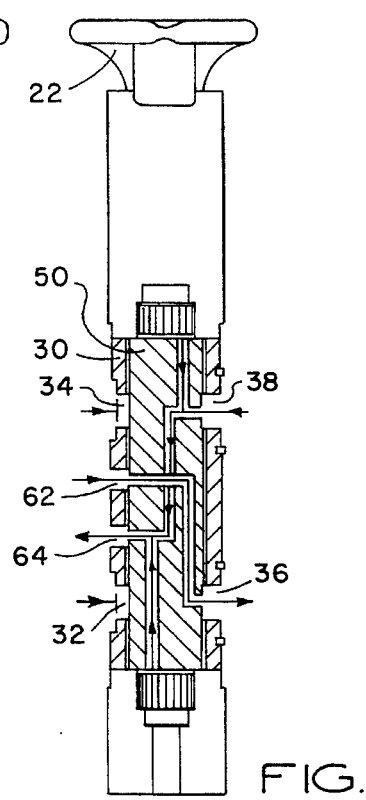

Referring now to FIG. 4D, the rotor has a fourth selectable "Δp CALIBRATE" position moved from the third selectable "DEPRESSURIZE/GAGE P CALIBRATE" position to the second limit. The first and second input passageways 32, 34 are blocked by rotor 50. The second instrumem passageway 38 is connected through rotor 50 to the vent/static calibrate passageway 64. The first instrument passageway 36 is connected through rotor 50 to the differential pressure calibration passageway 62.

In operation, six separate modes are obtainable by sequencing the valve from the first to second limit and then back to the first limit. In the "NORMAL" position, process pressures flow through the manifold to the transmitter in "NORMAL" mode. All other passageways through the body and rotor are double blocked.

In the "ZERO/REPRESSURIZE" position, reached by a 90 degree turn of handle 22, the low side of the transmitter is blocked (at second input passageway 34) and process pressure is equally distributed to both sides of the transmitter at instrument passageways 36, 38. The device is in "ZERO" mode when moved from the "NORMAL" position. After all the sequencing, the second selectable "ZERO/REPRESSURIZE" position is again reached wherein process pressure is throttled through orifice 108 to slowly pressurize tim transmitter in "REPRESSURIZE" mode.

In the third selectable "DEPRESSURIZE/GAGE P CALIBRATE" position, the process is blocked on both sides while pressure on the transmitter and the body cavity is bled off backwards through the throttling orifice 108 and vent/static calibrate passageway 64. This is "DEPRESSURIZE" mode. The reverse flow through orifice 108 removes any lodged particles. In this position, when moved from the fburth position, the gauge pressure of the transmitter can be calibrated through passageway 64, with pressure being ported to both sides of the transmitter to protect the transmitter from over-range. This is the "GAGE P CALIBRATE" mode.

In the fourth selectable "Δp CALIBRATE" position, process pressure is blocked on both sides. A calibration signal pressure enters through differential pressure calibration passageway 62 to the high side of the transmitter at first instrument passageway 36. The low side of the transmitter and body cavity are vented through vent passageway 64. In the fourth selectable position, a leak test is automatically provided, because if the inlet seals are leaking, process pressure will vent out the vent port 64.

While a specific embodiment of the present invention has been described in detail herein and shown in the accompanying drawings, it will be evident that various further modifications are possible without departing from the scope of the invention.

I claim:

1. A manifold for connecting a differential pressure transmitter to a source of diffremial pressure, comprising:

a body having first and second input passageways adapted to be connected to the source of differential pressure, first and second instrument passageways adapted to be connected to a transmitter for measuring differemial pressure, an equalizer passageway, a differential pressure calibration passageway, and a vent/static calibrate passageway;

a rotor mounted for motion within the body between a first limit and a second limit;

the rotor having a first selectable "NORMAL" position at the first limit, where the first input passageway is connected through the rotor to the first instrument passageway, and the second input passageway is connected through the rotor to the second instrument passageway, with the equalizer passageway, differential pressure calibration passageway and vent/static calibrate passageway being blocked by the rotor;

the rotor having a second selectable "ZERO/REPRESSURIZE" position moved from the first selectable "NORMAL" position in the direction of the second limit, where the first input passageway is connected through the rotor to the first and second instrument passageways by way of the equalizer passageway, the second input passageway is blocked by the rotor, with the differential pressure calibration passageway and vent/static calibrate passageway being blocked by the rotor;

the rotor having a third selectable "DEPRESSURIZE/ GAGE P CALIBRATE" position moved from the second selectable "ZERO/REPRESSURIZE" position in the direction of the second limit, where the first and second input passageways are blocked by the rotor, the first and second instrument passageways are connected through the rotor to the vent/static calibrate passageway, with the differential pressure calibration passageway being blocked by the rotor; and the rotor having a fourth selectable "ΔP CALIBRATE" position moved from the third selectable "DEPRESSURIZE/GAGE P CALIBRATE" position to the second limit, where the first and second input passageways are blocked by the rotor, the second instrument passageway is connected through the rotor to the vent/ static calibrate passageway, and the first instrument passageway is connected through the rotor to the differential pressure calibration passageway.

2. The manifold of claim 1 where the rotor is rotatably mounted within the body.

3. The manifold of claim 2 where the rotor is mounted for a combination of axial and rotary motion with respect to the body.

4. The manifold of claim 3 where the first and second limits are about 270 degrees apart.

5. The manifold of claim 4 where the first, second, third and fourth selectable positions are about 90 degrees apart.

6. The manifold of claim 3 where a handle is interconnected with the rotor and body. and the handle is rotatably movable with respect to the body and the rotor axially movable with respect to the handle.

7. The manifold of claim 1 with the rotor including a throttling orifice between the first input passageway and the first and second instrument passageways to permit slow repressurization of the transmitter in the second selectable position after depressurization in the third selectable position.

8. The manifold of claim 7 with flow through the orifice being reversible to remove lodged particles.

9. The manifold of claim 7 with porting to the orifice being so arranged such that flow goes backward through this same orifice during the depressurize mode to allow unplugging and discharge through the vent port of any particles which may have lodged in the orifice during the previous repressurizing mode.

10. The manifold of claim 3 with the rotor having walls defining at least one spiral groove in an outer surface, and the body having at least one trapped ball riding in the groove to define the axial and rotary motion of the rotor with respect to the body.

11. A manifold for connecting a differential pressure transmitter to a source of differential pressure, comprising:

a body having first and second input passageways adapted to be connected to the source of differential pressure, first and second instrument passageways adapted to be connected to a transmitter for measuring differential pressure, an equalizer passageway, a differential pressure calibration passageway, and a vent/static calibrate passageway;

a rotor mounted within the body for a combination of axial and rotary motion with respect to the body between a first limit and a second limit, the rotor having walls defining at least one spiral groove in an outer surface, and the body having at least one trapped ball riding in the groove to define the axial and rotary motion of the rotor with respect to the body, the first and second limits being about 270 degrees apart;

the rotor having a first selectable "NORMAL" position at the first limit, where the first input passageway is connected through the rotor to the first instrument passageway, and the second input passageway is connected through the rotor to the second instrument passageway, with the differential pressure calibration passageway, equalizer passageway and vent/static calibrate passageway being blocked by the rotor;

the rotor having a second selectable "ZERO/REPRESSURIZE" position moved from the first selectable "NORMAL" position in the direction of the second limit, where the first input passageway is connected through the rotor to the first and second instrument passageways by way of the equalizer passageway, the second input passageway is blocked by the rotor, differential pressure calibration passageway and vent/static calibrate passageway being blocked by the rotor;

the rotor having a third selectable "DEPRESSURIZE/ GAGE P CALIBRATE" position moved from the second selectable "ZERO/REPRESSURIZE" position in the direction of the second limit, where the first and second input passageways are blocked by the rotor, the first and second instrument passageways are connected through the rotor to the vent/static calibrate passageway, with the differential pressure calibration passageway being blocked by the rotor:

the rotor having a fourth selectable "Δp CALIBRATE" position moved from the third selectable "DEPRESSURIZE/GAGE P CALIBRATE" position to the second limit, where the first and second input passageways are blocked by the rotor, the second instrument passageway is connected through the rotor to the vent/ static calibrate passageway, and the first instrument passageway is connected through the rotor to the differential pressure calibration passageway;

with the rotor including a throttling orifice between the first input passageway and the first and second instrument passageways to permit slow repressurization of the transmitter in the second selectable position after depressurization in the third selectable position; and with a handle interconnected with the rotor and body, and the handle being rotatably movable with respect to the body and the rotor axially movable with respect to the handle, and where the first, second, third and fourth selectable positions are about 90 degrees apart.

\* \* \* \* \*